(12) United States Patent
Lee

(10) Patent No.: US 8,751,840 B2
(45) Date of Patent: Jun. 10, 2014

(54) COMPUTER PROVIDING MOTION PICTURE MODE AND METHOD OF SETTING UP SYSTEM-MODE WHILE PLAYING MOTION PICTURES

(75) Inventor: Jung-Hwan Lee, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 558 days.

(21) Appl. No.: 12/249,670

(22) Filed: Oct. 10, 2008

(65) Prior Publication Data

US 2009/0100279 A1    Apr. 16, 2009

(30) Foreign Application Priority Data

Oct. 11, 2007  (KR) .................. 10-2007-0102799

(51) Int. Cl.
*G06F 1/00* (2006.01)
(52) U.S. Cl.
USPC .......................................... 713/322; 713/324
(58) Field of Classification Search
USPC .......... 710/300, 310, 320–324, 601; 713/300, 713/310, 320–324, 601
See application file for complete search history.

(56) References Cited

U.S. PATENT DOCUMENTS

| | | | |
|---|---|---|---|
| 5,167,024 A * | 11/1992 | Smith et al. .................. | 713/322 |
| 5,537,650 A * | 7/1996 | West et al. .................... | 713/324 |
| 5,659,763 A * | 8/1997 | Ohashi .......................... | 713/320 |
| 6,442,699 B1 | 8/2002 | Nakajima | |
| RE38,108 E * | 5/2003 | Chee et al. .................... | 345/212 |
| 6,751,742 B1 * | 6/2004 | Duhault et al. ............... | 713/323 |
| 6,850,240 B1 * | 2/2005 | Jones, Jr. ...................... | 345/503 |
| 6,931,557 B2 * | 8/2005 | Togawa ......................... | 713/323 |
| 7,281,146 B2 * | 10/2007 | Nalawadi et al. ............. | 713/320 |
| 7,369,113 B2 * | 5/2008 | Washio et al. ................ | 345/100 |
| 7,634,668 B2 * | 12/2009 | White et al. .................. | 713/300 |

FOREIGN PATENT DOCUMENTS

| | | |
|---|---|---|
| CN | 1629773 A | 6/2005 |
| KR | 10-2005-0092163 A | 9/2005 |
| KR | 10-2007-0083312 A | 8/2007 |

* cited by examiner

*Primary Examiner* — Khanh Dang

(74) *Attorney, Agent, or Firm* — Birch, Stewart, Kolasch & Birch, LLP

(57) ABSTRACT

The present invention relates to a computer providing a motion picture mode including at least one storage unit configured to store system state information when the computer enters the motion picture mode and to store motion picture data, the storage unit including a random access memory (RAM) and a hard disk drive (HDD), a graphic processing unit configured to process image data and to display processed data on a screen, an audio outputting unit configured to process and output audio signals, and a control unit configured to control modules included in the computer and a system mode of the computer. The control unit is configured to determine whether conditions for entering the motion picture mode have been satisfied, and to change the system mode to the motion picture mode if the conditions for the motion picture mode are satisfied.

13 Claims, 3 Drawing Sheets

(Graph indicating the relation between the clock speed and the work load)

(Graph indicating the relation between the clock speed and the amount of consumed power)

COMPUTER PROVIDING MOTION PICTURE MODE AND METHOD OF SETTING UP SYSTEM-MODE WHILE PLAYING MOTION PICTURES

CROSS REFERENCE TO RELATED APPLICATIONS

The present application is related to, and claims priority to, Korean patent application No. 10-2007-0102799, filed on Oct. 11, 2007, the entire contents of which are hereby incorporated by reference.

BACKGROUND OF THE INVENTION

1. Field of the Invention

The present invention relates to a computer for providing a motion picture mode in which system power supplied to unnecessary devices to play motion pictures is turned off so that power consumption is minimized, when the computer system only plays motion pictures.

2. Description of the Related Art

Recently, various methods for reducing power consumption of computer systems are developed. As one of these methods, a technology for reducing power consumption by means of power management standards, like ACPI (Advanced Configuration and Power Interface) power management, is being developed.

In particular, as portable computers are widely used, this technology for reducing power consumption is significantly discussed in order to find a way to use portable computers for a longer time with the batteries of the same capacity.

Meanwhile, use of multi-media data is increasing rapidly and a function of computers as multi-media (comprising motion pictures) players beyond simple computing apparatuses is gradually expanded. That is, users of computers are watching motion pictures, like movies, dramas or UCC (User Created Contents), on computers at any time or at any place. Therefore, there is a need to reduce power consumption so as to allow a user to watch such motion pictures for a longer time.

SUMMARY OF THE INVENTION

It is an object of the present invention to provide a computer and a method for setting up power management modes comprising a motion picture mode in which system power is supplied only to necessary devices in the computer to play motion pictures while playing motion pictures.

To achieve these and other advantages and in accordance with the object of the present invention, as embodied and broadly described herein, the present invention provides in one aspect a computer providing a motion picture mode according to an aspect of the present invention for achieving the objects, comprises a RAM for storing motion picture data to be played; a memory unit configured to store system state information when the computer enters the motion picture mode; a graphic processing unit configured to process image data and to display processed data on a screen; an audio outputting unit configured to process and output audio signals; and a control unit configured to control modules comprised in the computer and system mode, wherein the control unit decides whether conditions for entering the motion picture mode have been satisfied, and change the system mode to the motion picture mode when the conditions for the motion picture mode are satisfied.

At this time, the motion picture mode may be a first motion picture mode in which system power is supplied only to the RAM, the graphic processing unit, the audio outputting unit and the control unit.

Also, the motion picture mode may a second motion picture mode in which system power is supplied only to the RAM, the graphic processing unit the audio outputting unit and the control unit: and clock speed of a central processing unit (CPU), the graphic processing unit and a bus of the computer is decreased.

Here, the memory unit may be selected from the RAM and a hard disk drive (HDD) by a user setting; and the RAM may store only the system state information and motion picture data being played during the motion picture mode, if the memory unit is the RAM.

Further, the memory unit may be selected from the RAM and a hard disk drive (HDD) by a user setting; and the RAM may store only motion picture data being played during the motion picture mode, if the memory unit is the hard disk drive.

Meanwhile, whether the conditions for entering the motion picture mode may be satisfied depends on at least one of whether motion pictures are playing, a kind of a current screen mode for playing a motion picture, a continuing time period of playing motion pictures, whether other operations are executed on the computer, and a continuing time period from the last user input.

At this time, the conditions for entering the motion picture mode may be satisfied when a motion picture is played on the computer and the continuing time period from the last user input is over a predetermined time.

Also, the conditions for entering the motion picture mode may be satisfied when a motion picture is played on the computer and the current screen mode for playing a motion picture is full-screen mode.

In addition, the conditions for entering the motion picture mode may be satisfied when a motion picture is played on the computer, the current screen mode for playing a motion picture is full-screen mode, and other operations, except playing a motion picture, are not executed on the computer.

Further, the conditions for entering the motion picture mode may be satisfied when a motion picture is played on the computer, the continuing time period of playing motion pictures is over a predetermined time, other operations, except playing a motion picture are not executed on the computer, and the continuing time period from the last user input is over a predetermined time.

In addition, the conditions for entering the motion picture mode may be satisfied when a motion picture is played on the computer, other operations, except playing a motion picture are not executed on the computer, and the continuing time period from the last user input is over a predetermined time.

Meanwhile, a method of setting up a system mode while playing motion pictures according to the present invention comprises the steps of: (A) determining whether conditions for entering a motion picture mode are satisfied; (B) storing system state information before the motion picture mode is being entered; and (C) changing the system mode to the motion picture mode, wherein the motion picture mode is a state in which system power is supplied only to necessary devices of the computer to play motion pictures.

At this time, the necessary devices of the computer to play motion pictures may comprise a RAM, a graphic processing unit, an audio outputting unit and a control unit if motion picture data to be played is stored in a hard disk drive (HDD) of the computer.

Further, the necessary devices of the computer to play motion pictures may further comprise the hard disk drive of the computer and the system power is intermittently supplied to the hard disk drive during the motion picture mode.

Meanwhile, the necessary devices of the computer to play motion pictures may comprise a RAM, a graphic processing unit, an audio outputting unit, a control unit and optical disk drive (ODD) if motion picture data to be played is stored in the optical disk drive.

In addition, whether the conditions for entering the motion picture mode of step (A) are satisfied may depend on at least one of whether motion pictures are playing, a kind of a current screen mode for playing a motion picture, a continuing time period of playing motion pictures, whether other operations are executed on the computer, and a continuing time period from the last user input.

Further, the system state information of step (B) may be stored in the RAM or a hard disk drive of the computer.

Here, the method may further comprise the step of (D) decreasing a clock speed of a central processing unit (CPU), the graphic processing unit, and a bus of the computer.

At this time, the clock speed of the central processing unit and the graphic processing unit may be controlled in order that the workload of the central processing unit and the graphic processing unit is to be 70% to 100% of the full workload of the central processing unit and the graphic processing unit in step (D).

In addition, the clock speed of the bus may be controlled to be corresponding to the clock speed of the central processing unit or the graphic processing unit in step (D).

Here, the step (D) may be periodically repeated so that the workload of the central processing unit and the graphic processing unit is maintained to be 70% to 100% of the full workload of the central processing unit and the graphic processing unit.

Further, the method further may comprise the steps of (E) detecting events for resuming from the motion picture mode; (F) turning the power supply back; and (G) returning the clock speed to a normal state.

At this time, the events for resuming from the motion picture mode of the step (E) may be generated by user input.

As described above in detail, in the computer and the method of setting up a system mode while playing motion pictures according to the present invention, the following advantages can be expected.

That is, since the system power supplied to devices not related to playing motion pictures is turned off, in case that other operations except playing a motion picture are not executed on the computer, it is advantageous in that unnecessary power consumption can be prevented.

Furthermore, in the computer and the method of setting up a system mode while playing motion pictures according to the present invention, since the clock speed of the central processing unit, the graphic processing unit and the bus is maintained as a proper speed to play motion pictures, it is advantageous in that power consumption according as the clock speed is maintained as a high speed can be prevented.

In another aspect, the present invention provides a computer providing a motion picture mode comprising: at least one storage unit configured to store system state information when the computer enters the motion picture mode and to store motion picture data, the storage unit including a random access memory (RAM) and a hard disk drive (HDD); a graphic processing unit configured to process image data and to display processed data on a screen; an audio outputting unit configured to process and output audio signals; and a control unit configured to control modules included in the computer and a system mode of the computer, wherein the control unit is configured to determine whether conditions for entering the motion picture mode have been satisfied, and to change the system mode to the motion picture mode if the conditions for the motion picture mode are satisfied.

In another aspect, the present invention provides a method of setting up a system mode in a computer while playing motion pictures according to the present invention comprises the steps of: (A) determining whether conditions for entering a motion picture mode are satisfied; (B) storing system state information before entering the motion picture mode; and (C) changing the system mode to the motion picture mode, wherein the motion picture mode is a state in which system power is supplied only to necessary devices of the computer to play the motion pictures Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Reference will now be made in detail to the preferred embodiments of the present invention, examples of which are illustrated in the accompanying drawings.

As the present invention may be embodied in several forms without departing from the spirit or essential characteristics thereof it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

Figure 1:
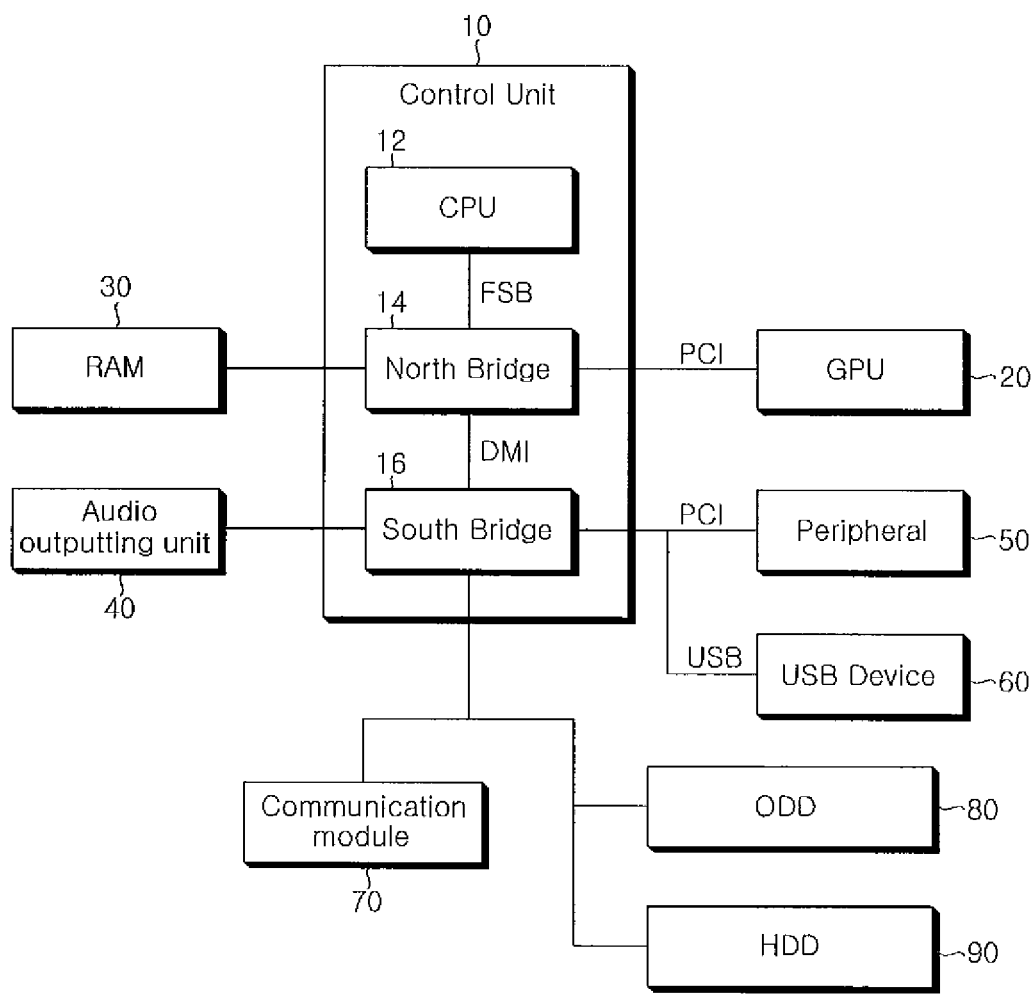
FIG. 1 is a block diagram showing the configuration of a computer providing a motion picture mode according to an embodiment of the present invention.

Hereinafter, a computer providing a motion picture mode according to an embodiment of the present invention will be described in detail with reference to the accompanying drawings. FIG. 1 is a block diagram showing the configuration of a computer providing a motion picture mode according to an embodiment of the present invention.

First of all, basic functions of principal modules illustrated in FIG. 1 will be described, and then characteristic functions of the embodiment of the present invention will be described.

As shown in FIG. 1, the computer providing a motion picture mode according to the embodiment of the present invention comprises a control unit 10, a graphic processing unit (hereinafter, 'GPU') 20 connected to the control unit 10, random access memory (hereinafter, 'RAM') 30, an audio outputting unit 40, peripherals 50, USB (universal serial bus) devices 60, a communication module 70, an optical disk driver (hereinafter; 'ODD') 80, and a hard disk driver (hereinafter, 'HDD') 90. The control unit 10 controls operation of the RAM 30, the audio outputting unit 40, the peripherals 50, the USB devices 60, the communication module 70, the ODD 80, and the HDD 90, and performs data operations and logic manipulations. For doing this, the control unit 10 comprises a central process unit (hereinafter, 'CPU') 12, and north and south bridges 14, 16 serially connected to the CPU 12.

The CPU 12 controls the north bridge 14, the south bridge 16, the RAM 30, the audio outputting unit 40, the peripherals 50, the USB devices 60, the communication module 70, the ODD 80, and the HDD 90, and performs data operations and logic manipulations. To achieve this, the CPU 12 comprises arithmetic and logic units (ALU), controlling units, registers and memory interfaces.

The north bridge 14 permits a two-way data communication between the CPU 12 and the RAM 30, the GPU 20 or the south bridge 16. Also, the north bridge 14 controls the GPU 20, the south bridge 16 and the RAM 30 under the control of the CPU 12. To achieve this, the north bridge 14 may be connected to the CPU 12 via a front side bus (FSB).

The south bridge 16 is a kind of a collection of registers for managing inputs and outputs of the peripherals 50 which have a relatively slow operating speed. The south bridge 16 provides a two-way data communication between the CPU 12 connected to the south bridge 16 through the north bridge 14 and the audio outputting unit 40, the peripherals 50, the USB devices 60, the communication module 70, the ODD 80 or the HDD 90. In addition, the south bridge 16 controls the audio outputting unit 40, the peripherals 50, the USB devices 60, the communication module 70, the ODD 80 and the ADD 90 under the control of the CPU 12 connected to the south bridge 16 via the north bridge 14. To achieve this, the south bridge 16 may be connected to the north bridge 14 by a direct media interface (DMI).

The GPU 20 displays the data processed by the control unit 10 on a display unit, like a cathode ray tube (CRT) or a liquid crystal display (LCD) panel and reduces an amount of data to be processed by the CPU 12 by means of bearing a part of the operation of the CPU 12. To this end, the south bridge 16 may be connected to the north bridge 14 by a PCI bus.

The RAM 30 is a working space for the control unit 10, more particularly the CPU 12. That is, the RAM 30 temporarily stores data which is processed or to be processed by the CPU 12. Accordingly, the RAM 30 may be connected to the north bridge 14. Further, the audio outputting unit 40 outputs audio data processed by the CPU 12. The audio outputting unit 40 may be supported by an Azalia codec.

In the meantime, the HDD 90 stores a plurality of programs including an operating system. System programs, such as the operating system, and application programs may be stored in a separate memory space, called ROM (read only memory). The operating system stored in the HDD 90 is uploaded to the RAM 30 by a system booting operation and is then executed. A plurality of the application programs stored on the HDD 90 is also uploaded to the RAM 30 and executed by user selection.

The control unit 10 detects playing of motion pictures, and checks a current screen mode for playing a motion picture, an elapsed time of playing motion pictures, whether other operations are executed on the computer, and a time elapsed since the last user input. This is to determine whether conditions for entering the motion picture mode are satisfied, through the results of these parameters checked by the control unit 10. Please note that the parameters to be checked by the control unit 10 are not limited to the parameters listed above.

The conditions for entering the motion picture mode may be set up with a combination of a plurality of the above parameters. For example, the conditions may be satisfied when a motion picture is being played on the computer and the time elapsed since the last user input is equal to or greater than a predetermined time. Furthermore, the conditions may be satisfied when a motion picture is being played on the computer and the current screen mode for playing a motion picture is a full-screen mode. Also, the conditions may be satisfied when a motion picture is being played on the computer, the current screen mode for playing a motion picture is full-screen mode, and other operations are not being executed on the computer. In addition, the conditions for entering the motion picture mode may be satisfied when a motion picture is played on the computer, the elapsed time of playing motion pictures is equal to or greater than a predetermined time, other operations (i.e. operations other than playing a motion picture) are not executed on the computer, and the time elapsed since the last user input is equal to or greater than a predetermined time. In the meantime, the conditions for entering the motion picture mode are satisfied when a motion picture is played on the computer, other operations than playing a motion picture are not executed on the computer, and the time elapsed since the last user input is equal to or greater than a predetermined time.

The conditions described in detail above, are just examples of conditions for entering the motion picture mode, and thus other conditions or other combinations of conditions or parameters than described above may be implemented.

In the meantime, the control unit 10 enters the system into the motion picture mode if the conditions for entering the motion picture mode are satisfied. At this time, the control unit 10 stores the system state information which indicates the current operating state of the computer system before entering the motion picture mode.

At this time, the memory space for storing the system state information is one of the RAM 30 and the HDD 90. The memory space for storing the system state information may be selected by a user setting. In a case where the system state information is stored in the RAM 30, time needed to be resumed from the motion picture mode is shortened, but the space of the RAM 30 to store motion picture data is reduced since the system state information occupies a part of the RAM 30. On the other hand, in a case where the system state information is stored in the HDD 90, the space of the RAM 30 to store motion picture data is expanded, but time needed to be resumed from the motion picture mode is increased. The difference between times needed to be resumed from the motion picture mode in these two cases may be accorded with the difference between times needed to be resumed from S3 state and S4 state of ACPI power management.

In the meantime, although the motion picture mode may have a plurality of operating methods according to various embodiments, the motion picture mode generally means a state where mainly the operation for playing motion pictures is executed and the system power is supplied mostly to the devices needed to play motion pictures to reduce power consumption. For example, the motion picture mode may be a state where only the operation for playing motion pictures is executed and the system power is supplied only to the devices needed to play motion pictures to reduce power consumption.

Hereinafter, the motion picture mode is described as being divided into two embodiments, that is, a first motion picture mode, and a second motion picture mode. However, the motion picture mode of this invention is not limited to these two embodiments.

First, the first motion picture mode is a state where the system power is supplied only to the RAM 30, the GPU 20, the audio outputting unit 40 and the control unit 10. At his time, the system power may be intermittently supplied to the HDD 90 to upload data from the HDD 90 to the RAM 30. With reference to FIG. 1, the system power supplied to the peripherals 50, the USB devices 60, the communication module 70, and the ODD 80 is turned off during the motion picture mode (when motion picture data to be played is stored on the ODD 80, the system power is supplied to the ODD 80). The RAM 30, the GPU 20, the audio outputting unit 40 and the control unit 10 are necessary to play a motion picture and the control unit 10 processes motion picture data uploaded to the RAM 30, and outputs the processed data through the GPU 20 and the audio outputting unit 40.

In the meantime, the second motion picture mode is a state where the system power is supplied only to the RAM 30, the GPU 20, the audio outputting unit 40 and the control unit 10 like the first motion picture mode, and additionally to where the clock speeds of the CPU 12, the GPU 20 and the bus. Here, the clock speeds are controlled in order for the workloads of the CPU 12 and the GPU 20 to be 70% to 100% of the full workloads of the CPU 12 and the GPU 20, respectively. Ideally, the clock speeds may be controlled in order for the workloads of the CPU 12 and the CPU 20 to be 100%. However, in this case, a delay on playing a motion picture may be caused, since a scheduler of the operating system does not guarantee real time operations when the workloads of the CPU 12 and the GPU 20 are 100% of the full workloads. Accordingly, it is preferred that the clock speeds are controlled in order for the workloads of the CPU 12 and the GPU 20 to be close to but under 100%. The reason for reducing the clock speeds is to prevent the unnecessary power consumption by means of reducing the clock speeds to the speeds needed to play a motion picture in the motion picture mode, although the CPU 12 and the GPU 20 are designed to be able to operate at a high clock speed enough to execute more complicated functions than just playing a motion picture.

Figure 2A:
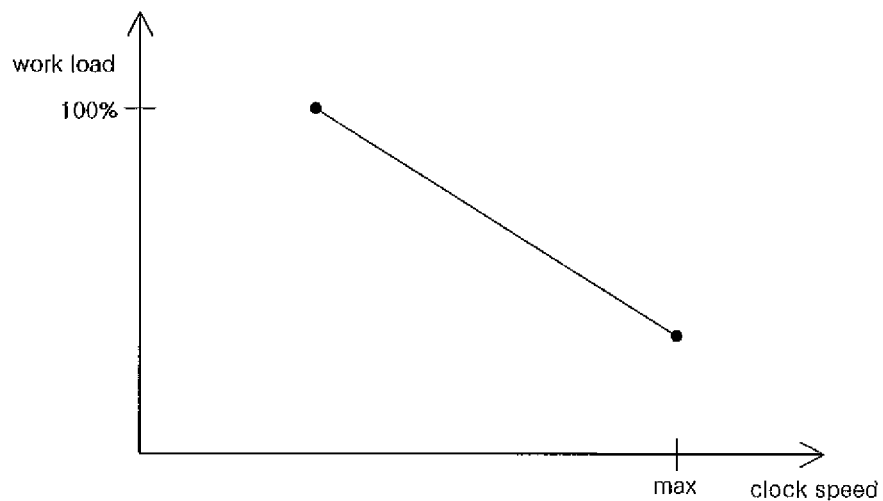
FIG. 2a is a graph indicating the relation between the clock speed and the work load of the processing units.
Figure 2B:
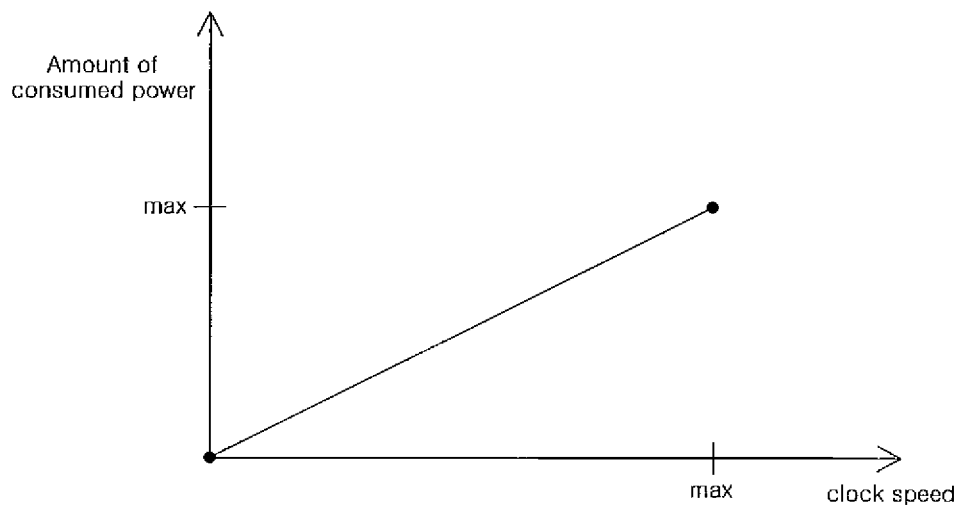
FIG. 2b is a graph indicating the relation between the clock speed and the amount of consumed power.

Hereinafter, the relation between the clock speed and the workload, and the relation between the clock speed and the amount of the power consumption will be described in detail with reference to FIG. 2a and FIG. 2b. FIG. 2a is a graph indicating the relation between the clock speed and the work load of the processing units, and FIG. 2b is a graph indicating the relation between the clock speed and the amount of power consumed at the processing units.

As shown in FIG. 2a, in a case where the computer is executing the same operation (playing a motion picture), the lower the clock speed is, the higher the workload of the processing units is. Moreover, as shown in FIG. 2b, the lower the clock speed is, the lower the power consumption is. Accordingly, in the second motion picture mode, the unnecessary power consumption is prevented by means of reducing the clock speeds of the CPU 12 and the GPU 20 to a proper speed to play a motion picture. Furthermore, the clock speeds of the buses to connect the CPU 12 and the GPU 20 are correspondingly reduced as the clock speeds of the CPU 12 and the CPU 20 are reduced. Moreover, the control unit 10 may detect the generation of events for resuming from the motion picture mode and resume the computer system to the system state before the motion picture mode. The events for resuming from the motion picture mode may be generated by user input through one of inputting units of the computer system or through a predetermined function key.

Hereinafter, the method of setting up the system mode using the computer providing the motion picture mode according to an embodiment of the present invention will be described in detail.

Figure 3:
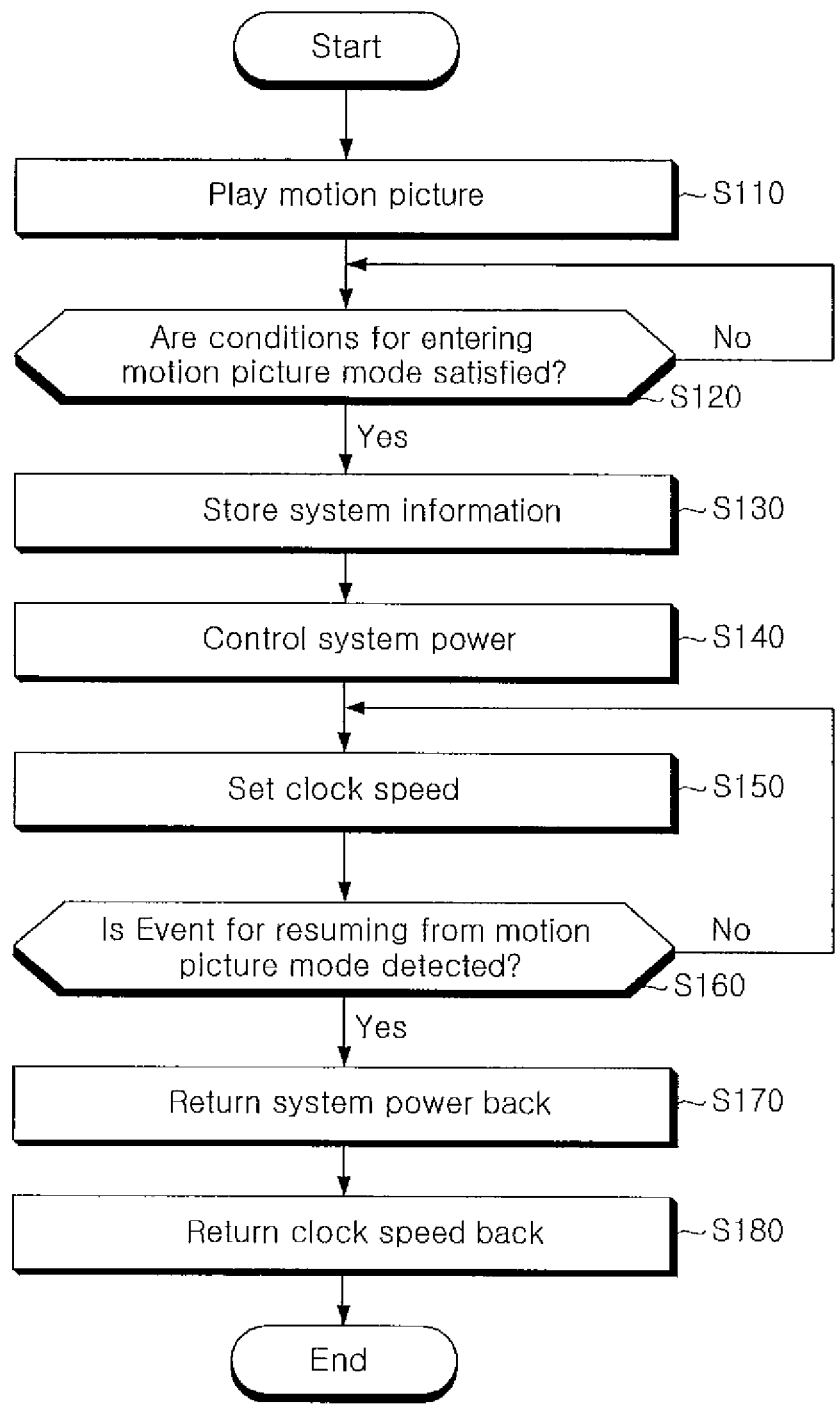
FIG. 3 is a flowchart illustrating a method of setting up a system mode while playing a motion picture according to an embodiment of the present invention.

FIG. 3 is a flowchart illustrating a method of setting up a system mode while playing a motion picture according to an embodiment of the present invention.

As shown in this figure, the method of setting up the system mode according to the embodiment of the present invention starts from a step of playing a motion picture (S110).

While playing a motion picture, the control unit 10 determines whether the conditions for entering the motion picture mode are satisfied (S110). At this time, whether the conditions for entering the motion picture mode are satisfied depends on at least one of whether motion pictures are playing, the type of a current screen mode for playing a motion picture, an elapsed time of playing motion pictures, whether other operations are executed on the computer, and a time elapsed since the last user input, as described above.

If the conditions for entering the motion picture mode are satisfied as a result of the determination in step S120, the control unit 10 permits the system information to be stored (S130). At this time, the memory space to store the system information may be one of the RAM 30 or the HDD 90, as described above.

After storing the system information, the control unit 10 permits the system to enter into the motion picture mode, and then controls the system power supplied to each of the devices of the computer system (S140). At this time, the control unit 10 supplies the system power only to the devices needed to play a motion picture and turns off the system power supplied to the devices not needed to play a motion picture. The devices needed to play a motion picture include the RAM 30, the GPU 20, the audio outputting unit 40, the control unit 10, and the HDD 90, when the motion picture data to be played is stored in the HDD 90. In this case, the RAM 30, the GPU 20, the audio outputting unit 40 and the control unit 10 are continuously supplied with the power, but the HDD 90 is intermittently supplied with the power. That is, the power is supplied to the HDD 90 only when data on the HDD 90 is being uploaded to the RAM 30. Accordingly, if all the motion picture data to be played can be uploaded together on the RAM 30 at once, the HDD 90 is not included in the devices needed to play a motion picture.

On the other hand, the devices needed to play a motion picture are the RAM 30, the GPU 20, the audio outputting unit 40, the control unit 10 and the ODD 80, when the motion picture data to be played is stored in the ODD 80. Then, the control unit 10 decreases the clock speeds of the CPU 12 and the GPU 20 so that the power consumption is reduced (S150). At this time, the clock speeds are controlled in order for the workloads of the CPU 12 and the CPU 20 to be 70% to 100% of the full workloads of the CPU 12 and the CPU 20, respectively. In addition, the clock speeds of the buses connected to the CPU 12 and the CPU 20 are correspondingly reduced to the clock speeds of the CPU 12 and the GPU 20, respectively. The step S150 is continuously performed periodically during the motion picture mode, in order that the power consumption is minimized by means of controlling the clock speed properly.

In the meantime, the control unit 10 detects whether the events for resuming from the motion picture mode are generated (S160). The events for resuming from the motion picture mode are events to resume the system from the motion picture mode to the state before entering the motion picture mode. Such events are typically generated when the user input is detected through inputting units on the computer system, like a keyboard and a mouse, but are not limited to the events of the user input detection.

In the step S160, when the events for resuming from the motion picture mode are detected, the control unit 10 resumes the system from the motion picture mode by means of turning the system power back to the state before entering the motion picture mode (S170), and returning the clock speed to the speed before entering the motion picture mode (S180). By means of turning the system power back to the state before entering the motion picture mode, the system power is supplied to the devices not needed to play a motion picture as well.

The scope of the present invention is not limited to the embodiments described above but is defined by the appended claims. It will be apparent that those skilled in the art can make various modifications and changes thereto within the scope of the invention defined by the claims.

What is claimed is:

1. A computer providing a motion picture mode, comprising:
   a random access memory (RAM) configured to temporarily store data which is processed or to be processed by the control unit;
   a storage unit configured to store motion picture data, the storage unit including a hard disk drive (HDD);
   a graphic processing unit configured to display image data of the motion picture data stored in the storage unit and processed by the control unit; and
   an audio outputting unit configured to output audio signals of the motion picture data stored in the storage unit and processed by the control unit;
   a control unit operatively connected to the RAM, the storage unit, the graphic processing unit and the audio outputting unit,
   wherein the control unit is configured to process the motion picture data stored in the storage unit and to control a system mode of the computer, and determine whether a condition for entering a motion picture mode has been satisfied,
   wherein the motion picture mode is a mode in which system power is supplied only to the RAM, the graphic processing unit, the audio outputting unit and the control unit, and wherein clock speeds of a central processing unit (CPU) of the control unit, the graphic processing unit and a bus of the computer are decreased when the condition has been satisfied,
   wherein, if the condition for the motion picture mode is satisfied, then the control unit stores system state information of a state before entering the motion picture mode in the RAM or the HDD, and changes the system mode to the motion picture mode,
   wherein the condition for entering the motion picture mode is satisfied with an elapse of a predetermined time after playing back motion pictures, and
   wherein the control unit resumes the state before entering the motion picture mode by resuming the supply of system power to the devices that are not needed to play motion pictures using the stored system state information when a resume event is detected during the motion picture mode.

2. The computer as claimed in claim 1,
   wherein one of the RAM and the HDD is selected as a memory unit by a user setting; and
   wherein the RAM stores the system state information during the motion picture mode, if the RAM is selected as the memory unit.

3. The computer as claimed in claim 1,
   wherein one of the RAM and the HDD is selected as a memory unit by a user setting; and
   wherein the HDD stores the system state information during the motion picture mode, if the HDD is selected as the memory unit.

4. A method of setting up a system mode in a computer while playing motion pictures, the method comprising:
   (A) determining, by the computer, whether a condition for entering a motion picture mode is satisfied; and
   when the condition for the motion picture mode is satisfied,
   (B) storing, by the computer, system state information of a state before entering the motion picture mode; and
   (C) changing, by the computer, the system mode from the state to the motion picture mode,
   wherein the motion picture mode is a mode in which system power being supplied to devices that are not needed to play motion pictures is turned off when the condition has been satisfied,
   wherein the condition for entering the motion picture mode is satisfied with an elapse of a predetermined time after playing back motion pictures, and
   wherein the method further comprises resuming the state before entering the motion picture mode by resuming the supply of system power to the devices that are not needed to play motion pictures using the stored system state information when a resume event is detected during the motion picture mode and returning a clock speed that was changed upon entering the motion picture mode to a clock speed of the state before entering the motion picture mode.

5. The method as claimed in claim 4, wherein the devices of the computer needed to play the motion pictures comprise a random access memory (RAM), a graphic processing unit, an audio outputting unit and a control unit if motion picture data to be played is stored in a hard disk drive (HDD) of the computer.

6. The method as claimed in claim 5, wherein the devices of the computer needed to play motion pictures further comprise the HDD of the computer and the system power is intermittently supplied to the HDD during the motion picture mode.

7. The method as claimed in claim 4, wherein the devices of the computer needed to play motion pictures comprise a RAM, a graphic processing unit, an audio outputting unit, a control unit and optical disk drive (ODD) if motion picture data to be played is stored in the ODD.

8. The method as claimed in claim 5, wherein the system state information of step (B) is stored in the RAM or the HDD of the computer.

9. The method as claimed in claim 8, wherein the method further comprises:
   (D) when the condition for the motion picture mode is satisfied, decreasing clock speeds of a central processing unit (CPU) of the control unit, the graphic processing unit, and a bus of the computer.

10. The method as claimed in claim 9, wherein the clock speeds of the central processing unit and the graphic processing unit are controlled in order for the workloads of the central processing unit and the graphic processing unit to be 70% to 100% of the full workloads of the central processing unit and the graphic processing unit in step (D), respectively.

11. The method as claimed in claim 10, wherein the clock speed of the bus is controlled to be corresponding to the clock speed of the central processing unit or the graphic processing unit in step (D).

12. The method as claimed in claim 9, wherein the step (D) is periodically repeated so that the workloads of the central processing unit and the graphic processing unit are maintained to be 70% to 100% of the full workloads of the central processing unit and the graphic processing unit, respectively.

13. The method as claimed in claim 4, wherein the resume event is generated by a user input.

* * * * *